M. LACHMAN.
DEMOUNTABLE VEHICLE WHEEL.
APPLICATION FILED FEB. 8, 1918.
1,324,970.
Patented Dec. 16, 1919.
2 SHEETS—SHEET 1.
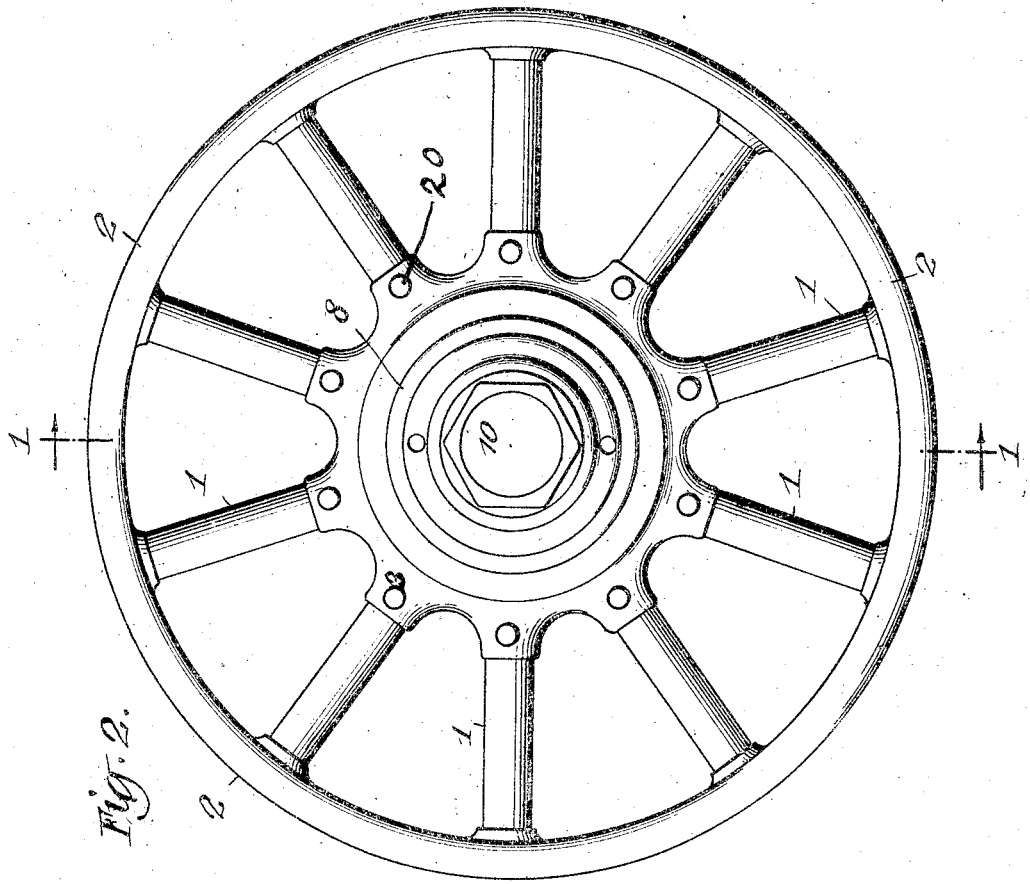
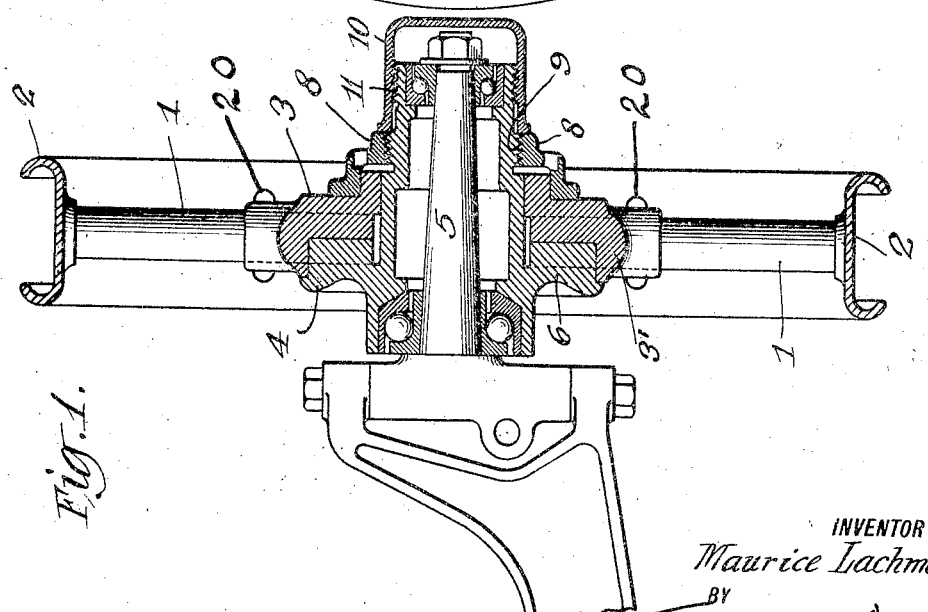
INVENTOR
Maurice Lachman
BY
Townsend & Decker
ATTORNEYS

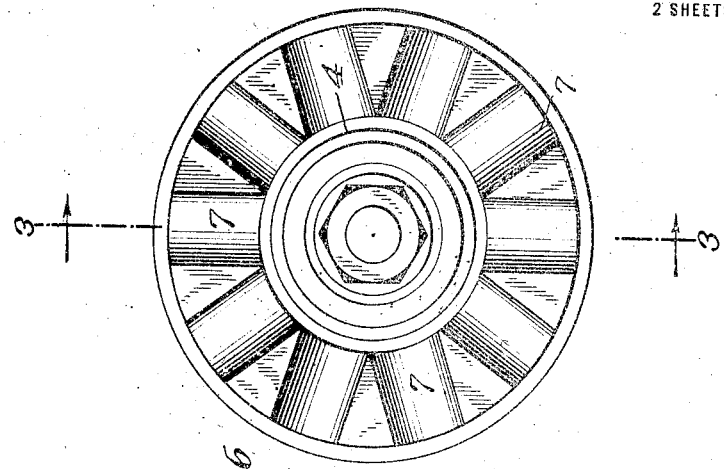
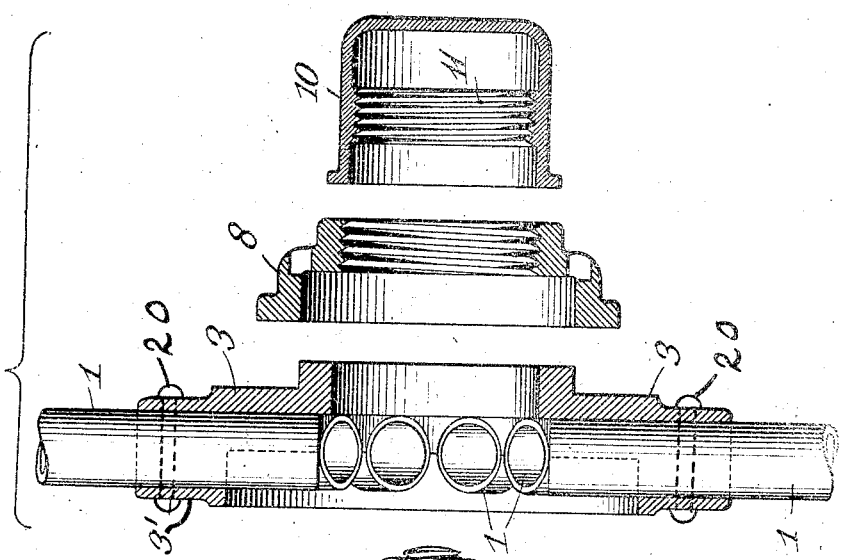
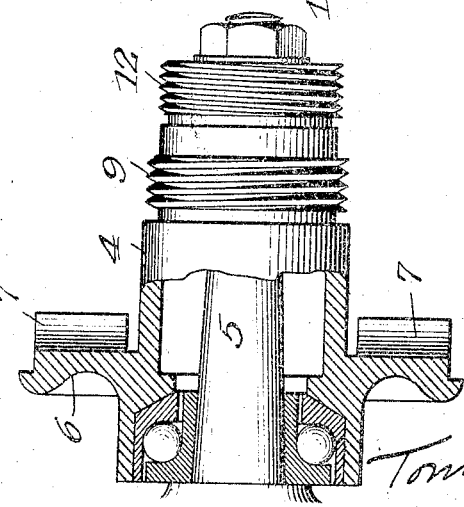

UNITED STATES PATENT OFFICE.

MAURICE LACHMAN OF NEW YORK, N. Y., ASSIGNOR TO STRUCTURAL PRESSED STEEL WHEEL COMPANY, INC., OF NEW YORK, N. Y., A CORPORATION OF NEW YORK.

DEMOUNTABLE VEHICLE-WHEEL.

1,324,970.   Specification of Letters Patent.   Patented Dec. 16, 1919.

Application filed February 8, 1918. Serial No. 215,983.

*To all whom it may concern:*

Be it known that I, MAURICE LACHMAN, a citizen of the United States, and a resident of New York, in the county of New York and State of New York, have invented certain new and useful Improvements in Demountable Vehicle-Wheels, of which the following is a specification.

My invention relates to the construction of that class of wheels in which a hub or hub section carrying spokes and rim and constituting the wheel proper or major portion of the wheel is separably secured to another member or hub section to form what is known in the art as a demountable wheel.

My invention relates more particularly to the construction of a wheel of this general class when made up with metal spokes and rim and consists in the special construction of hub portion whereby two sections or members separably fastened together are secured more firmly and with a more effective driving connection from the axle to the spokes and rim by a direct interlocking of the inner ends of the spokes carried by one member with the complementary section or member to which the spoke carrying member is demountably or separably secured.

The invention consists in the special construction and combination of parts more particularly hereinafter described and then specified in the claims.

Figure 1 is a vertical section on the line 1—1 of Fig. 2 of a wheel constructed in accordance with my invention and Fig. 2 is a side elevation thereof.

Fig. 3 shows in side elevation and partial section the hub member carried by the axle and to which the spoke carrying member is detachably secured, the sectioned parts being shown in section on the line 3—3 of Fig. 5.

Fig. 4 shows in vertical section and in detached position the spoke carrying member with the parts by which it is fastened in place.

Fig. 5 is a face view of the member shown in Fig. 3.

1 indicates the spokes usually and preferably made of metal tubes secured by welding or other means at their outer ends to the metal rim 2. The latter is shown as made in the usual way from metal having clencher edges adapted to secure an ordinary form of deflatable pneumatic tire or shoe. 3 is the demountable or separable hub or hub section in which the spokes 1 are secured at their inner ends and 4 is the complementary hub or member upon which the member 3 fits as shown and to which it is separably fastened as will be presently described.

The spokes 1 are preferably mounted in the section 3 by socketing the same in sockets formed in an overhang or flange 3' through which the spokes 1 extend radially inward so as to leave their sides exposed for interlocking with the face of a flange of the complementary hub or hub member 4 which is the driving or driven member of the wheel and which, for convenience, may be termed the fixed or non-demountable member of the construction. Said member 4 is here shown as rotatably mounted by means of the ordinary ball bearings upon a spindle 5 constituting the spindle of the steering knuckle for the front wheel of an automobile although, as well understood in the art, said member 4 might be fixed upon an axle as in the case, for instance, of the rear wheel of an automobile. On the face of the member 4 or an integral flange 6 thereof radially extending grooves or concavities, as indicated at 7, are formed of proper shape to fit upon the sides of the inner ends of spokes 1 at the portion thereof projecting radially inward from the socket proper in the member 3 thereby forming an interlocking engagement of said spokes below the socket with the permanent or non-demountable member. Preferably the member 4 fits within an annular recess in the vertical face of the member 3. When the two members are clamped together as shown in Fig. 1, a strong and firm connection is established by which power may be effectively transmitted when the member 4 is a driven member, directly from said member to the inner ends of the spokes carried by and socketed in the demountable member 3. Member 3 fits upon the periphery of member 4 preferably, and if desired the inner ends of the spokes 1 may be of such length as to seat directly upon the periphery of member 4 although, in Fig. 1, they are shown as slightly separated therefrom.

For fastening the two sections together any desired means may be employed as for instance a nut 8 having an internal thread adapted to engage an external thread 9 upon the end of the hub barrel extending outward and preferably formed integrally with member 4 and in addition a hub cap or locking nut 10 having a reverse screw thread 11 adapted to engage an external reverse screw thread 12 upon the extreme end of the hub member 4. Or in place of these usual expedients other means may be employed whereby the member 3 fitting upon the cylindrical portion of the member 4 may be clamped against the face thereof by any other desired means.

As will be understood, the inner portions of the spokes 1 may be fastened against radial movement in their sockets by rivets 20 or otherwise if desired, although this is not necessary to the main purpose of my invention.

The sockets for the ends of the spokes within the member 3 as well as the driving concavities 7 may be formed in any desired way but are preferably provided in an expeditious manner by clamping the members 3 and 4 together and boring radial holes therein of the same size as the spoke tubes. After this operation when the two members are separated the sockets in the member 3 as well as the concavities 7 of the member 4 so formed assure accurate and positive fit of the parts.

What I claim as my invention is:—

1. A demountable metal wheel having a separable hub member in which the spokes are mounted to leave their inner ends extending radially inward from the point of mounting combined with the complementary hub member having upon its face grooves or concavities to adapt said complementary hub member to fit partially around and form interlocking engagement with the sides of the exposed ends of said spokes when the demountable member is locked in position against the complementary hub member.

2. In a separable or demountable metal wheel, a separable hub member having spokes projecting radially inward therethrough and demountably fitted directly upon the hub barrel and a complementary hub member having radially extending grooves or notches formed in the face thereof embracing the sides of the projecting inner ends of the spokes when the two members are clamped together.

3. In a separable metal wheel, the combination of a hub member having radially extending sockets through which the inner ends of the spokes project radially inward to expose the sides of the spokes and a complementary hub member having a flange provided with radially extending concavities on the face thereof to interlock with the sides of the projecting inner ends of the spokes when the two members are fastened together.

4. In a metal wheel, the combination with a separable hub member provided with a socketed flange in which the spokes are socketed and through which their ends extend radially inward to expose the sides of the spokes below the sockets and a complementary hub member fitting an annular groove in the face of the separable hub member and having radially extending concavities formed in the face thereof to interlock with the exposed sides of the inner ends of the spokes.

5. In a demountable wheel, the combination with a separable hub member in which the spokes are socketed with their inner ends exposed, of a complementary hub member having an integral flange provided with notches or grooves in a vertical face thereof to receive and fit around the sides of the exposed inner ends of the socketed spokes.

6. In a demountable wheel, the combination with a separable hub member in which the spokes are socketed, of a complementary hub member having an integral flange provided with notches or grooves in a vertical face thereof to receive the inner ends of the socketed spokes and means for separably clamping the two members together with the sides of the spokes engaged in said notches.

7. In a wheel, the combination of two hub sections or members and means for separably fastening them together, of wheel spokes permanently fastened in the separable member with their ends between the point of fastening and center exposed on one side for interlocking with the other member when the two hub sections are secured together.

Signed at New York, in the county of New York and State of New York, this 7th day of February, A. D. 1918.

MAURICE LACHMAN.

Witnesses:
F. B. TOWNSEND,
IRENE LEFKOWITZ.